US012347344B2

(12) United States Patent
Bailey

(10) Patent No.: US 12,347,344 B2
(45) Date of Patent: Jul. 1, 2025

(54) QUICK CHANGE SIGN HOLDER AND METHOD FOR SECURING A SIGN TO A CONTAINER

(71) Applicant: Buckhorn Inc., Milford, OH (US)

(72) Inventor: Scott Bailey, Cincinnati, OH (US)

(73) Assignee: Buckhorn Inc., Milford, OH (US)

( * ) Notice: Subject to any disclaimer, the term of this patent is extended or adjusted under 35 U.S.C. 154(b) by 380 days.

(21) Appl. No.: 18/186,566

(22) Filed: Mar. 20, 2023

(65) Prior Publication Data

US 2023/0343248 A1 Oct. 26, 2023

Related U.S. Application Data

(60) Provisional application No. 63/363,425, filed on Apr. 22, 2022.

(51) Int. Cl.

*G09F 7/18* (2006.01)
*B65D 88/08* (2006.01)
*B65D 90/00* (2006.01)
*G09F 23/00* (2006.01)

(52) U.S. Cl.

CPC ............... *G09F 7/18* (2013.01); *B65D 88/08* (2013.01); *B65D 90/00* (2013.01); *G09F 23/00* (2013.01); *G09F 2007/1843* (2013.01); *G09F 2023/0025* (2013.01)

(58) Field of Classification Search

CPC .... G09F 7/18; G09F 23/00; G09F 2007/1843; G09F 2023/0025; B65D 88/08; B65D 90/00

See application file for complete search history.

(56) References Cited

U.S. PATENT DOCUMENTS

| | | | | | |
|---|---|---|---|---|---|
| 4,518,080 | A * | 5/1985 | Ohlson | A45C 11/182 | 206/39 |
| 6,010,022 | A * | 1/2000 | Deaton | B65D 77/0466 | 220/666 |
| 6,584,712 | B2 * | 7/2003 | Magid | B62B 3/1408 | 40/642.02 |
| 6,820,853 | B1 * | 11/2004 | DuBarry | A47G 1/1686 | 248/495 |
| 7,513,073 | B1 * | 4/2009 | Smith | G09F 15/0025 | 40/607.05 |
| 10,497,291 | B1 * | 12/2019 | Bailey | G09F 1/12 | |
| 2010/0055380 | A1 * | 3/2010 | Schutz | B65D 77/0466 | 428/81 |
| 2010/0077641 | A1 * | 4/2010 | Greenwald | G09F 7/10 | 40/611.11 |
| 2016/0015180 | A1 * | 1/2016 | Ramirez | A47C 1/16 | 297/188.2 |
| 2018/0374397 | A1 * | 12/2018 | Kopelke | G09F 7/08 | |
| 2023/0343248 | A1 * | 10/2023 | Bailey | B65D 88/08 | |

* cited by examiner

*Primary Examiner* — David R Dunn
*Assistant Examiner* — Christopher E Veraa
(74) *Attorney, Agent, or Firm* — Vorys, Sater, Seymour and Pease LLP; Rex W. Miller, II

(57) ABSTRACT

Exemplary embodiments of the present disclosure relate to devices and methods for removably securing a placard to a container. Disclosed frames and methods include an elastic retention member configured to engage a collar of a projection to secure a placard in to a frame—the frame secured to a container.

23 Claims, 6 Drawing Sheets

QUICK CHANGE SIGN HOLDER AND METHOD FOR SECURING A SIGN TO A CONTAINER

CROSS-REFERENCE TO RELATED APPLICATION

This application claims priority to U.S. Provisional Application No. 63/363,425, filed Apr. 22, 2022, which is incorporated by reference herein in its entirety.

BACKGROUND

A placard is a card or plaque made of paper, plastic or metal, on which an advertising message, trademark or other information is printed or displayed. These placards are generally about 16 inches tall by about 24 inches wide and about 0.030 inches thick. Placards may have a plurality of holes configured to receive fasteners to fix the placard to a side of a "grain bin" (any type of bulk, flowable material container having a base and sides). One example of a grain bin is disclosed in U.S. Pat. No. 6,010,022 entitled, "Dispensing Box for Flowable Material" issued Jan. 4, 2000, and assigned to Buckhorn Inc., the content of which is incorporated by reference in its entirety.

Placards are usually attached to a grain bin using a plurality of screws (four-six screws). Removing and replacing a placard attached with screws is time consuming. Screws may be dropped or lost. Moreover, driving screws into a plastic substrate repeatedly will eventually strip the plastic material into which the screw threads engage. Eventually, it becomes nearly impossible to attach a placard to the grain bin and the grain bin requires repair.

Sign holders have been developed where placards may slide in and out yet, still require either a screw or bending of the placard to tuck under integrated tabs of a frame so that the placard does not slide back out. One example of such is disclosed in U.S. Pat. No. 10,497,291 entitled "Frame for a Grain Bid Placard" issued Dec. 3, 2019, and assigned to Buckhorn, Inc., the content of which is incorporated by reference in its entirety. While the number of screws is reduced, the issue with screws in plastic described above still exists. Thus, an apparatus for quickly and reliably attaching a placard to a grain bin without damaging the plastic material is desired.

SUMMARY OF DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

The present disclosure generally relates to a placard holder including a frame member attached to the side of a container. A specialized fastener is attached to the container configured to engage an aperture in a placard. An elongated retention member is affixed to the top of the frame member and engages a projection such as the head of the fastener to secure an inserted placard in place. While the exemplary embodiments are described with respect to a grain bin/storage container it is to be appreciated that the present exemplary embodiments are also amenable to other like applications (e.g., motor vehicles, freight-hauling trailers and railroad freight cars).

In accordance with one aspect of the present disclosure, a frame assembly for displaying a placard on a grain bin, is described. The frame assembly includes a frame member defining a back wall, a front wall, and a sidewall connecting the back and front wall, wherein the front, back, and sidewalls form substantially U-shaped profiles along first and second substantially parallel sides, and a bottom edge. For example, the sidewall may connect the front wall to form an L-shaped cross section at some longitudinal positions along an edge and may connect to the back wall at other longitudinal positions along the edge to form an L-shaped cross section such that a U-shaped profile is defined along the edge. In other embodiments, the front, back and sidewalls may all be connected at a single longitudinal position to form a U-shaped channel at that longitudinal position. The frame assembly also includes a projection that extends outward from the frame member and is configured to extend though a similarly aligned aperture in a placard. The frame assembly includes an elongated retention member attached to a top portion of the frame member and configured to engage the projection. In a further embodiment, the projection is a fastener that threads though an aperture in the back wall of the frame member. The fastener may include an outwardly extending collar. In another further embodiment, the fastener is a double headed fastener. In another further embodiment, the retention member is an elastic string. In another further embodiment, the sidewall and the back wall from a flange portion between two spaced apart gaps in the sidewall. In another further embodiment, the retention member is a loop that is removably wrapped around the flange portion. In another further embodiment, the frame member includes two spaced apart slots in the back wall adjacent to a top portion of the sidewall. In another further embodiment, the retention member comprises first and second ends and at least one stop sized larger than the slots, the stop having a central bore though which a string of the retention member threads. In another further embodiment, the retention member is secured to the container.

In accordance with another aspect of the present disclosure a method for securing a placard is described. The method includes, providing a frame assembly including a frame member having a back wall, a front wall, and a sidewall connecting the back and front wall, wherein the front, back, and sidewalls form a substantially U-shaped profile along first and second substantially parallel sides and a bottom edge; a fastener received in a top central aperture of the back wall, the fastener having a collar portion extending outward from the frame member, the frame assembly including an elongated retention member attached to a top portion of the frame member and configured to engage the collar of the fastener. The method also includes inserting a placard into the frame member between the back wall and the front wall, wherein the collar of the fastener extends through an aperture of the placard. The method also includes engaging the elongated retention member with the collar of the fastener, such that the elongated retention member overlaps a top edge of the placard.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
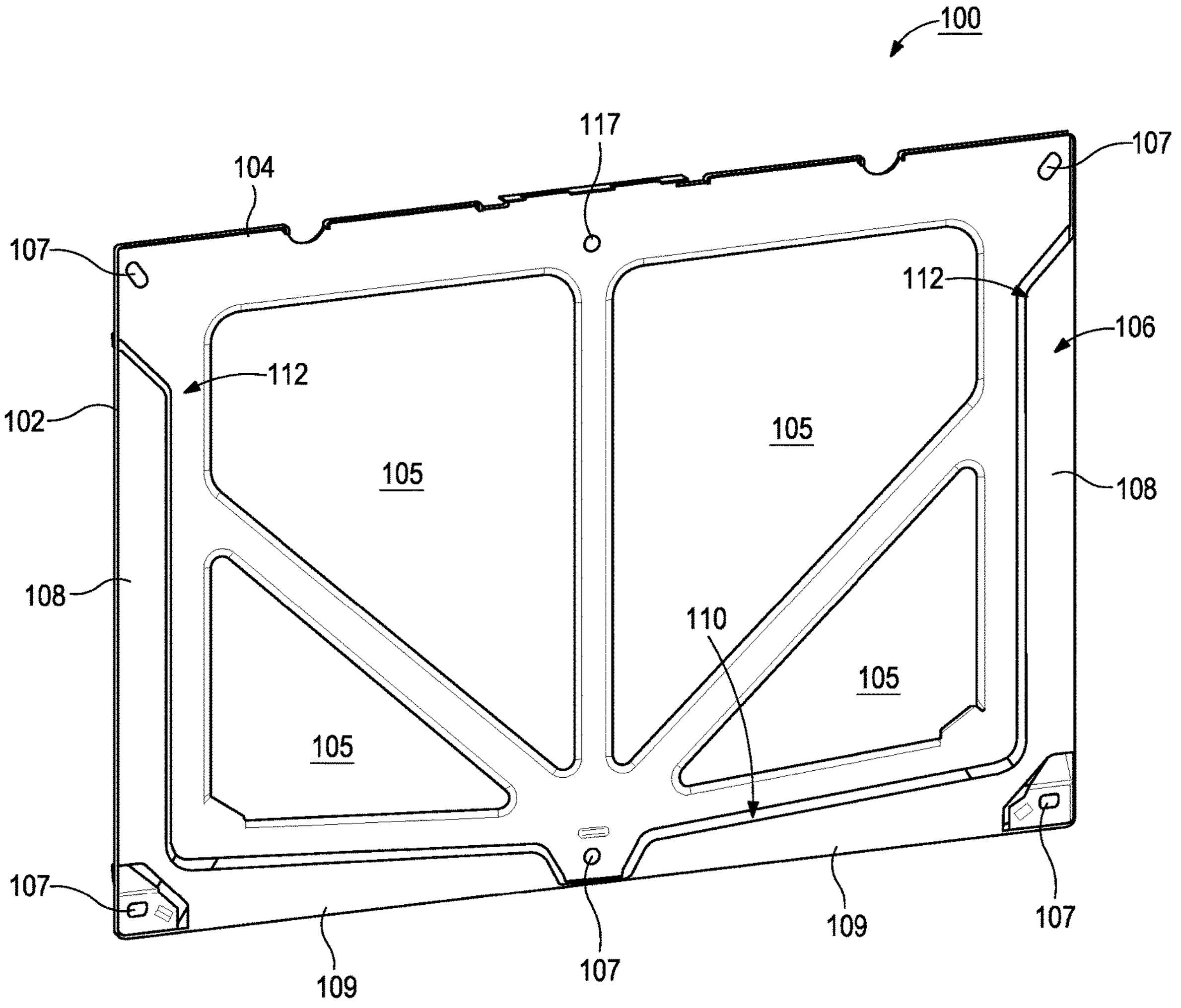
FIG. 1 illustrates a frame member for displaying a placard on a container in accordance with the present disclosure.

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms "generally" and "substantially" are intended to encompass structural or numeral modification which do not significantly affect the purpose of the element or number modified by such term.

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Exemplary embodiments of the present disclosure relate to devices and methods for removably securing a placard to a container. This is particularly challenging due to the limited space available for attaching placards. Nothing must extend beyond the edges of the container. Furthermore, solutions must be cost effective and easy to use.

Referring now to FIG. 1, there is shown an exemplary embodiment of a placard frame member 100 in accordance with the present disclosure without a placard 200 (FIG. 2B) inserted therein. The frame member 100 is configured to be attached to the side of a container. The frame member 100 may be secured to the container via a plurality of fasteners. Alternatively, the frame member 100 may be welded (ultrasonic welding and the like) to the side of the container. In the illustrated embodiments, the frame member 100 is substantially rectangular in shape and configured to receive a similarly shaped placard.

The frame member 100 may include a substantially continuous sidewall 102 that separates a back wall 104 from a front wall 106, wherein a placard is configured to be placed between the spaced apart back and front walls 104, 106 of the frame member 100. The back wall 104 may include a plurality of cutouts 105 (portions where there is no material) in order to reduce the amount of material of the frame member 100 and save weight while still providing a back support of the frame member 100 and to an inserted placard. The back wall 104 may include at least one aperture 107 configured to receive a faster for securing the frame member 100 to the side of a container. In the illustrated embodiment, the frame member 100 may be secured to the container by five (5) fasteners, one in each aperture 107, one proximate to each corner of the frame member 100 and one located in the center along a bottom end of the frame member 100. It is to be appreciated that the number and location of apertures 107 is not limiting and that any number of apertures at any location may be used to secure the frame 100 to the container.

Along the bottom end, a bottom horizontal support channel 110 is formed from a bottom length of the sidewall 102, the back wall 104, and a bottom portion 109 of the front wall 106. While the bottom portion 109 of front wall 106 is illustrated as two tabs extending along the bottom length, the bottom portion 109 of front wall 106 may include more than two tabs or may be a single continuous tab. The sidewall 102, back wall 104, and bottom portion 109 of front wall 106 form the bottom horizontal support channel 110 with a substantially U-shaped profile for receiving a placard. When a placard is inserted in the bottom horizontal support channel 110, a bottom edge of the placard abuts a bottom portion of the sidewall 102 and is retained in place by at least the bottom portion 109 of the front wall 106.

Along each lateral side of the frame member 100, vertical support channels 112 are formed from side portions of the sidewall 102, the back wall 104, and side portions 108 of the front wall 106. While the side portions 108 are illustrated as single tab portions, each extending along the side lengths, the side portions 108 may include multiple tabbed portions, similar to that as the multiple tab portions of the bottom portion 109. The sidewall 102, back wall 104, and side portions 108 form vertical support channels 112 with a substantially U-shaped profile for receiving a placard. When a placard is inserted in the side vertical support channels 112, the placard is retained in place by at least the side portions 108 of the front wall 106.

The frame member 100 also includes a projection 117 that extends outward from the back wall 104. The projection 117 is configured to receive/engage with an elongated retention member 218 (FIG. 2B), discussed in greater detail below. The projection 117 may be substantially cylindrical and/or may have surface features, such as a hook or flange (see 417 FIGS. 4A-4B) such that the elongated retention member 218 is prevented from sliding off the projection 117. When the elongated retention member 218 is engaged with the projection 117, a placard 200 (FIG. 2B) is prevented from sliding out of the frame member 100.

Figure 2A:
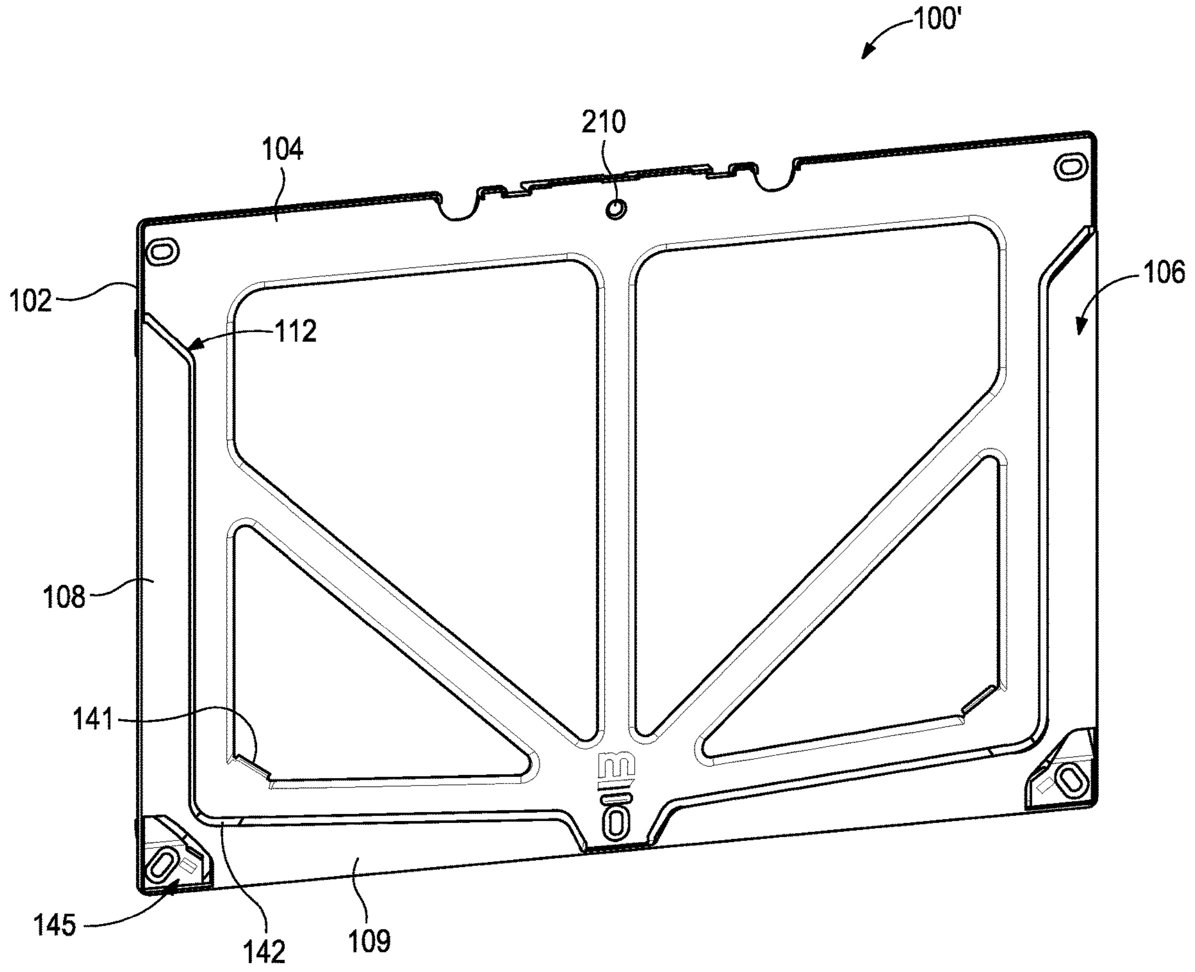
FIG. 2A illustrates another exemplary frame member for displaying a placard on a container in accordance with the present disclosure.
Figure 2B:
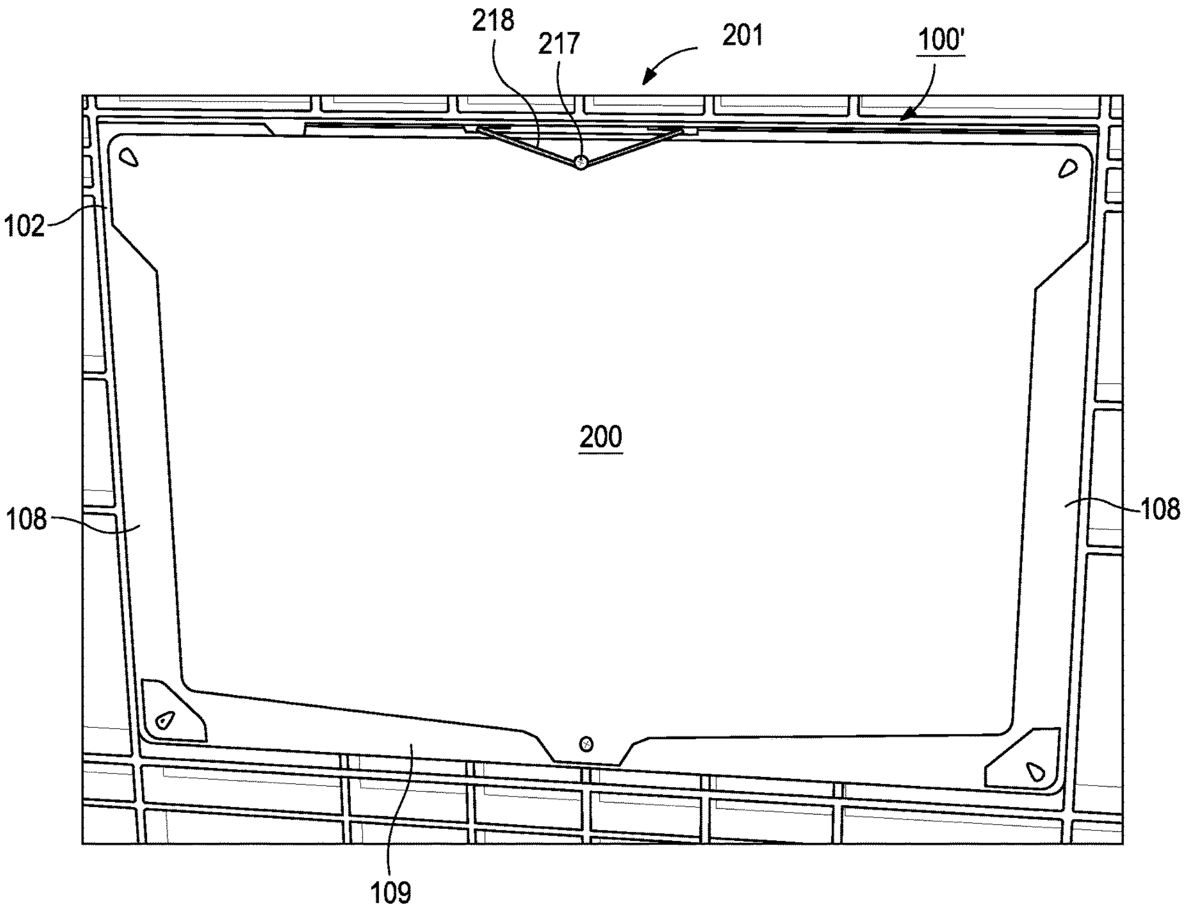
FIG. 2B illustrates a frame assembly including the frame member of FIG. 2A with a placard inserted therein.

In some embodiments and with reference to FIGS. 2A-2D a frame member 100', which includes many of the same elements as frame member 100 and may be best understood with respect thereto, also includes a projection aperture 210 in the back wall 104 configured to receive a projection 217 that is separate from the frame member 100'. In some embodiments, the projection 217 is embodied as a fastener. In some embodiments, the projection aperture 210 is sized such that the projection 217 may aid in securing the frame member 100' to the side of a container, however this is not required. The projection 217 may also include a collar 219 configured to engage and retain the elongated retention member 218 in a frame assembly 201 as illustrated in FIG. 2B. When the elongated retention member 218 is engaged with the projection 217, a placard 200 is prevented from sliding out of the frame member 100'. In some embodiments, the projection 217 is a double headed fastener, described in greater detail below. In some embodiments, the back wall 104 may include ramp-like protuberances to facilitate installation of the placard 200 into the frame member 100'. For example, ramp-like protuberances such as those described in U.S. Pat. No. 10,497,291 (which is incorporated herein by reference) may be provided on the back wall 104 or other portions of the frame member 100'.

The elongated retention member 218 may be removably attached to portion of the frame member 100, 100'. In the illustrated embodiments, the retention member 218 is attached to a top portion of the frame member 100'. In some embodiments, the elongated retention member 218 comprises a string of a predetermined length, such that when the retention member 218 is engaged with a projection such as projections 117, 217, a placard 200 is secured into the frame member 100, 100', i.e., the placard is prevented from sliding out. In some embodiments, the retention member 218 is composed of elastomeric material, e.g., rubber band, bungee, and the like. While the exemplary embodiments described herein relate to a retention member 218 being attached to the frame member 100, 100', it is to be appreciated that a retention member 218 may be attached to and or have ends attached directly to the container. That is, a retention member 218 does not need to be connected to the frame member 100, 100' in order to interact with a projection 117, 217 and prevent a placard from sliding out.

With reference to FIG. 2A, the frame member 100' may include at least one hinge 141, that hingedly connects the sidewall 102 to the back wall 104, or the back wall 104 to itself. The connection allows a section of material 142 to fold 180 degrees and permanently or securely connect to the back wall 104 at a back wall receiving portion 145 to create a continuous back. The back wall receiving portion 145 may include an aperture configured to receive a correspondingly shaped projection (or vice versa) to connect the section of material 142 with the back wall 104. This allows for an injection molding process to create a continuous front wall 106 on the side portions 108 and bottom portion 109—eliminating areas for the placard 200 to get caught or slide out during installation. This connection could also be made from a separate piece (similar to section 142) rather than a hinged section.

In other embodiments, the front wall of a frame may fold away or otherwise disengage from the back wall, wherein a placard 200 may be placed against the back wall, and then the front wall may be re-engaged with the back wall to retain the placard within the frame member. The frame member may be similarly equipped with a flange portion 202 (FIGS. 2C and 2D) or slots 302 (FIG. 3B) for receiving a retention member, such as retention members 218, or 318 described below.

Figure 2C:
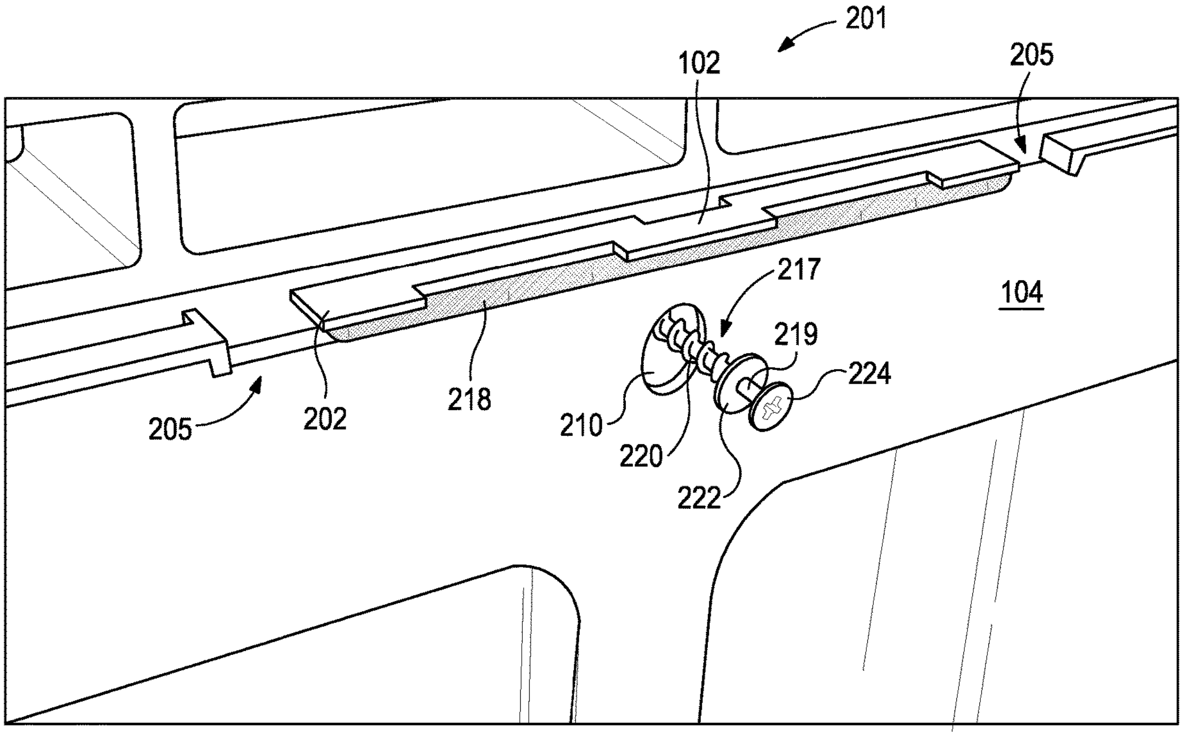
FIG. 2C illustrates an enlarged view of a top portion of a frame assembly in accordance with one exemplary embodiment of the present disclosure.
Figure 2D:
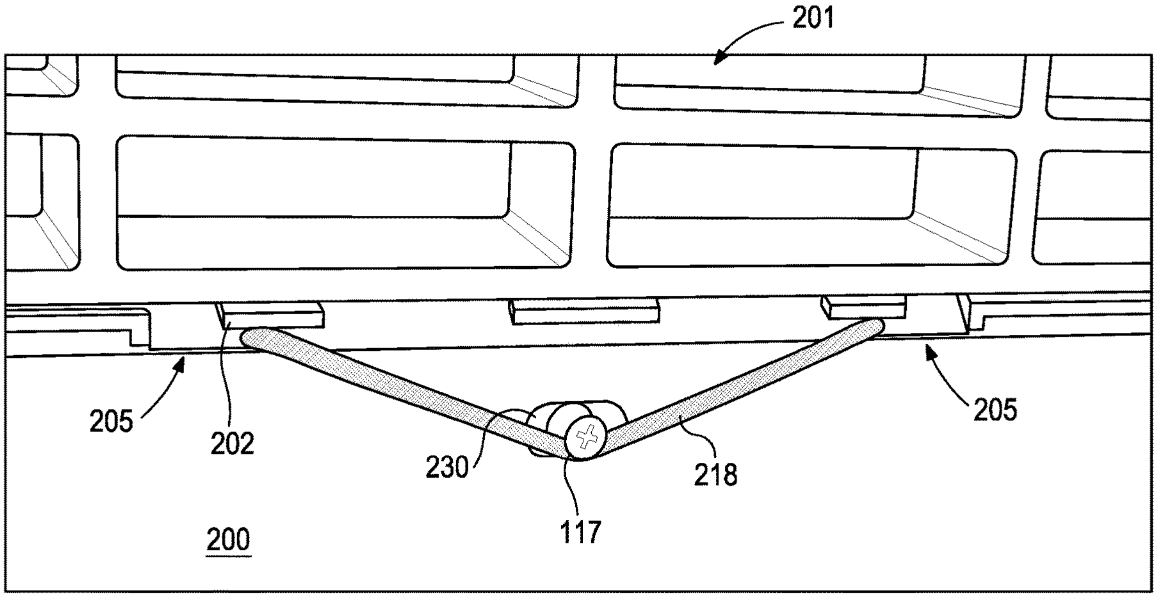
FIG. 2D illustrates an enlarged view of a top portion of the frame member of FIG. 2A including a placard inserted therein.

FIGS. 2C and 2D illustrate enlarged views of the frame assembly 201. A portion of the frame member 100' is configured to carry/receive the retention member 218 with a projection 217 embodied as double headed fastener. In the exemplary embodiment of FIGS. 2C and 2D, the sidewall 102 includes two spaced apart gaps 205 extending into the back wall 104 where the sidewall 102 extends over a portion of the gap 205. That is, the sidewall 102 overhangs and extends perpendicularly from the back wall 104, creating a flange 202. The cross-section thereof as viewed from the side may be substantially T-shaped. It is to be appreciated that while a T-shape cross-section is shown, the shape is not limiting and that other shapes, such as an L-shaped cross-section, with a lip extending perpendicular from the container, may be substituted herein without departing from the scope of this disclosure. The retention member 218 may be in the form of a loop and wrap around the back wall 104. The retention member 218 is therefore prevented from sliding off from the flange portion 202 due to the overhang of sidewall 102 over the gap 205. The spaced apart gaps 205 in the sidewall 102 may also facilitate removal of the placard 200 from the frame member 100, 100' as the fingers of a person may be able to slip behind the placard 200 unimpeded by the sidewall 102 and flex the placard 200 outward for removal.

As illustrated in FIGS. 2C and 2D, when the placard 200 is inserted into the frame member 100', a hole 230 in the placard 200 is aligned with projection 217 such that the collar portion 219 of the projection 217 extends through the placard hole 230. The retention member 218 may be manipulated (extended, stretched, or otherwise positioned) to wrap over top of the placard 200 and engage the collar portion 219 of the projection 217. The engagement between the projection 217 and retention member 218, prevent the placard 200 from sliding out (from the top) of the frame. In some embodiments, the retention member 218 is taught (under tension) and presses a retention force on the placard 200 to secure the placard to the frame 100' (such as pressing the placard 200 against the back wall 104).

The projection 217 embodied as a double-headed fastener (illustrated in FIGS. 2B-2D) may be similar to a bear claw type fastener typically used for mounting picture frames and the like. That is, the projection 217 may include a threaded portion 220 configured to thread into the plastic walls of a container. A first head 222, adjacent the threaded portion, may press against and secure the frame member 100' to the container. For example, the projection aperture 210 may be sized such that the first head 222 does not pass through the projection aperture 210, but presses against the back wall 104 (FIG. 2A) of the frame member 100' to aid in securing the frame member 100' to the side of a container. In other embodiments, the projection aperture 210 may be sized as a clearance hole that may be installed over the projection 217. The first head 222 may pass through the projection aperture 210 and provide a stopping point when attaching the projection 217 directly to the container. The second head 224, is spaced apart from the first head 222, defining the collar 219 there between. The second head 224 may include tool receiving portion configured to receive the head of a screwdriver (flat head, Phillips-head, hex-key head, star head, etc.). The second head 224 may extend outward from the diameter of the collar portion 219 and provide a flange that prevents the retention member 218 from slipping/disengaging the collar 219. The projection 217 may also prevent the placard 200 from sliding up and out of the frame member 100' due to the nature of being extended through the hole 230 in the placard 200.

Figure 3A:
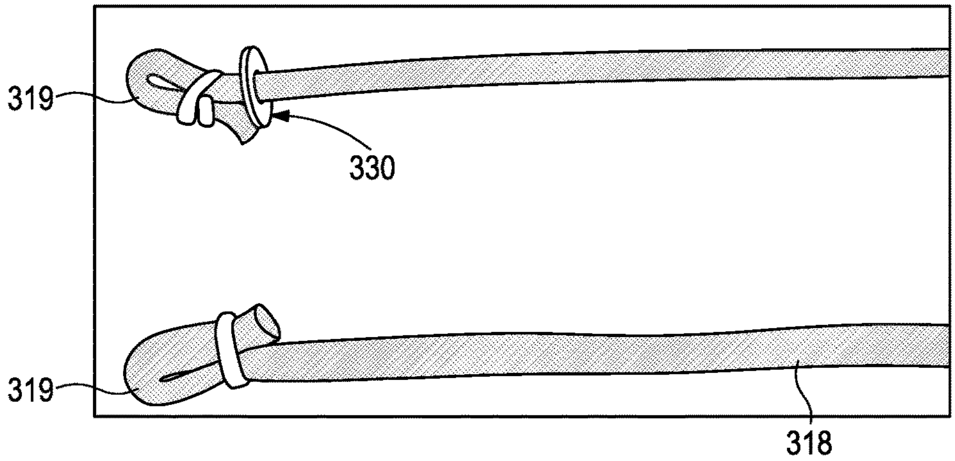
FIG. 3A illustrates the ends of retention members in accordance with the present disclosure.
Figure 3B:
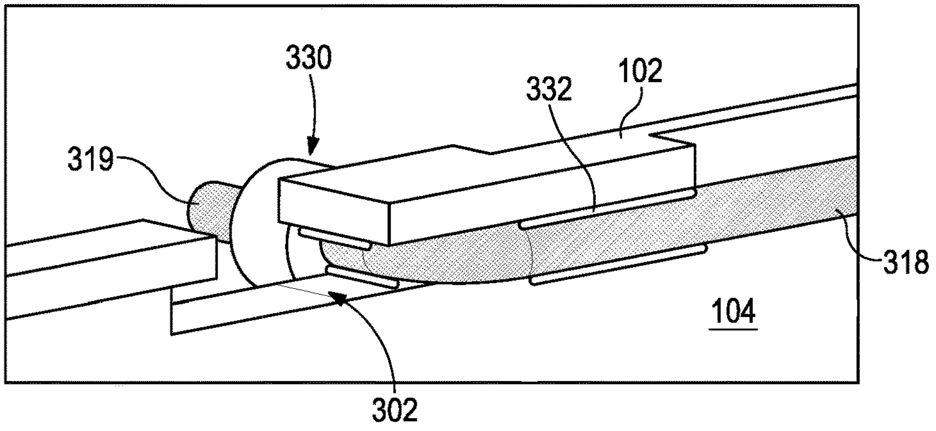
FIG. 3B illustrates a retention member installed in a slot of a frame member in accordance with the present disclosure.
Figure 3C:
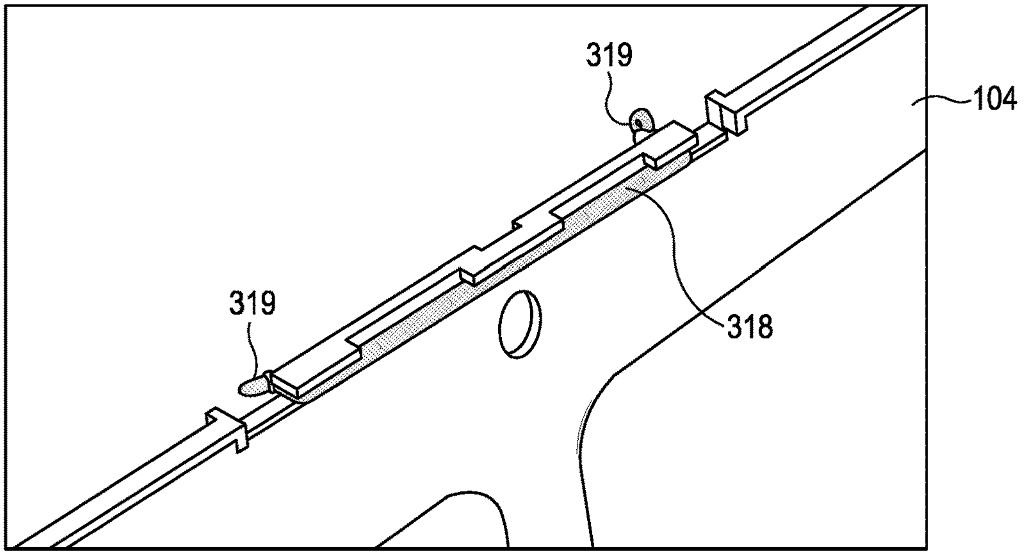
FIG. 3C illustrates another example of retention member installed in a slot of a frame member in accordance with the present disclosure.

In another embodiment, illustrated in FIGS. 3A-3C a retention member 318 is a length of string configured to engage slots 302 disposed in the back wall 104 of a frame member. The retention member 318 may include or carry a stop 330 sized larger than the slot 302 that prevents the retention member from pulling out of the slot 302. In the illustrated embodiments, the stop 330 is shown as cylindrical member having a central bore though which the retention member 318 threads. In FIG. 3A, the ends 319 of the retention member 318 may be folded against itself, creating a thickness that cannot travel through the bore of the stop 330. In other embodiments, the retention member 318 may be knotted at each end to retain the stops 330 on the retention member 318. In yet still other embodiments, the stops 330 are crimped or otherwise adhered near the ends 319 of the retention member 318. In some embodiments, stops sized larger than the slots may be defined knotted or folded ends of the retention member 318. In other embodiments, the ends of the retention member may be secured by staples, adhesives or by other attachment mechanisms without the use of slots 302. As illustrated in FIG. 3B, the ends 319 of the retention member 318 may be adhered to the back wall 104 and/or sidewall 102 with an adhesive 332.

Figure 4A:
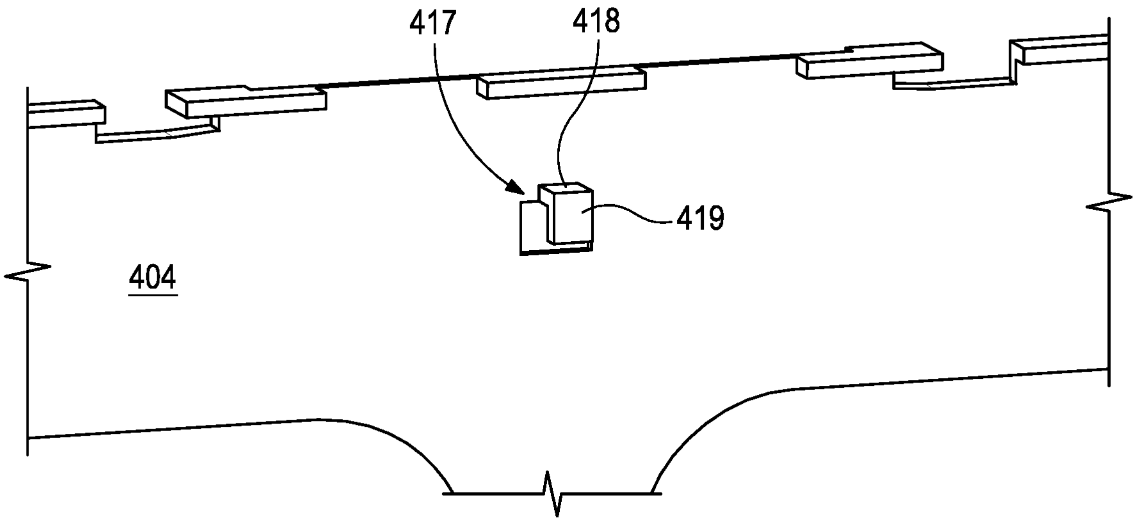
FIG. 4A illustrates another exemplary frame member including an integrated projection in accordance with the present disclosure.
Figure 4B:
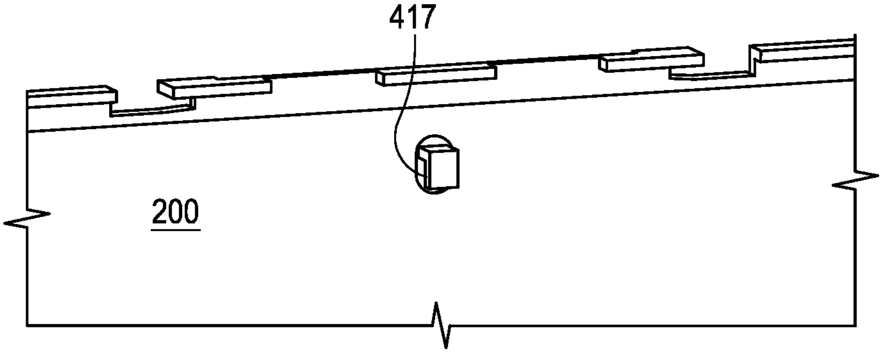
FIG. 4B illustrates an enlarged view of the frame member of FIG. 4A with a placard inserted therein.
Figure 4C:
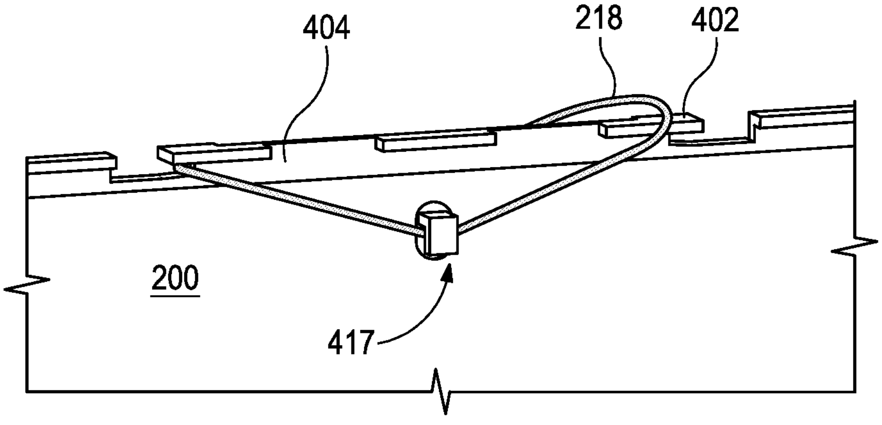
FIG. 4C illustrates the frame member and placard of FIG. 4B with the retention member of FIG. 2B partially installed.

FIGS. 4A and 4B show another exemplary embodiment of a projection 417 that may extend outward from the back wall 404 of a frame member as briefly discussed below. Here the projection 417 includes a first wall 418 extending outward from the back wall 404 and a second wall 419 substantially perpendicular to the first wall (and substantially parallel with the back wall). The first and second walls 418, 419 defining a hook configured to retain an elongated retention member, such as retention members 218, 318 as discussed above. FIG. 4C illustrates retention member 218 partially installed around projection 417. The retention member 218 is a continuous loop wrapped around the back wall 404 and the projection 417. The retention member 218 may be wrapped around a flange portion 402 to secure the placard 200 in place.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A frame assembly for displaying a placard on a container, the frame assembly comprising:
- a back wall;
- a front wall;
- a sidewall connecting the back and front wall, wherein the front, back, and sidewalls form channels with substantially U-shaped profiles along first and second substantially parallel sides, and a bottom end;
- a projection, the projection extending outward from the back wall and configured to extend though a similarly aligned hole in a placard; and
- an elongated retention member configured to overlap an edge of the placard and engage the projection.

2. The frame assembly according to claim 1, wherein the projection is a fastener in an aperture of the back wall.

3. The frame assembly according to claim 2, wherein the fastener is a double headed fastener.

4. The frame assembly according to claim 1, wherein the projection defines a hook configured to retain the elongated retention member.

5. The frame assembly according to claim 1, wherein the projection is integrated with the back wall.

6. The frame assembly according to claim 1, wherein the retention member is an elastic string.

7. The frame assembly according to claim 1, wherein the sidewall and the back wall form a flange portion between two spaced apart gaps in the sidewall.

8. The frame assembly according to claim 7, wherein the retention member is a loop that is removably wrapped around the flange portion.

9. The frame assembly according to claim 7, wherein the flange portion has one of a T-shaped and L-shaped cross-section.

10. The frame according to claim 1, further comprising two spaced apart slots in the back wall adjacent to a top portion of the sidewall.

11. The frame assembly according to claim 10, wherein the retention member comprises a first end and a second end and carries at least one stop sized larger than the slots.

12. The frame assembly according to claim 10, wherein the retention member is a loop that is removably wrapped around the flange portion.

13. The frame assembly according to claim 1, wherein the retention member comprises a first end and a second end and wherein the ends are adhered to the back wall or sidewall.

14. A method for securing a placard to a container, the method comprising:
- providing a frame member having a back wall, a front wall, and a sidewall connecting the back and front wall, wherein the front, back, and sidewalls form channels with substantially U-shaped profiles along first and second substantially parallel sides of the frame member and a bottom end of the frame member;
- providing a projection extending outward from the back wall of the frame member;
- providing an elongated retention member configured to engage the projection;
- inserting a placard into the substantially U-shaped channels, wherein the projection extends through a hole of the placard,
- engaging the elongated retention member with the projection such that the elongated retention member overlaps a top edge of the placard.

15. The method of claim 14, further comprising securing the frame member to the container with at least one fastener.

16. A system for securing a placard, the system comprising:
- a container;
- a frame member coupled to the container, the frame member including a front wall, a back wall and a sidewall connecting the back wall and the front wall, wherein the front wall, back wall and sidewall form channels with substantially U-shaped profiles along first and second substantially parallel sides and a bottom end of the frame member;
- a projection, the projection extending outward from the back wall and configured to extend though a similarly aligned hole in a placard; and
- an elongated retention member configured to engage the projection to retain the placard within the frame member.

17. The system according to claim 16, wherein the container is a grain bin.

18. The system according to claim 16, wherein the elongated retention member is coupled to the container.

19. The system according to claim 16, wherein the frame member further comprises a section of material connecting a first portion of the back wall to a second portion of the back wall.

20. The system according to claim 19, wherein the section of material is hinged to the first portion of the back wall.

21. The system according to claim 20, wherein the second portion of the back wall includes a back wall receiving portion with an aperture configured to receive a correspondingly shaped projection on the section of material to connect the section of material with the second portion of the back wall.

22. The system according to claim 16, wherein the projection is a fastener engaging the back wall to press the frame member against the container.

23. The system according to claim 16, wherein the projection is a fastener passing through a clearance hole defined in the back wall and engaging the container.

* * * * *